United States Patent [19]

Kripner

[11] 4,357,814
[45] Nov. 9, 1982

[54] AIRCRAFT PETCOCK LOCK

[76] Inventor: George C. Kripner, 5420 E. Avalon Dr., Phoenix, Ariz. 85018

[21] Appl. No.: 182,838

[22] Filed: Aug. 29, 1980

[51] Int. Cl.³ .................. F16L 35/00; F16K 35/10; G05G 5/00
[52] U.S. Cl. .................................. 70/232; 70/177; 70/178; 137/382; 137/383; 220/210
[58] Field of Search .............. 70/232, 231, 178, 175, 70/174, 163-169, 181, 211, 209, 207, 57, 23, 34, 32, 14, 177; 251/90, 91, 93, 144, 95, 339, 100; 137/233, 234, 382-384; 220/85 P, 86 AT, 210, DIG. 6

[56] References Cited

U.S. PATENT DOCUMENTS

| 441,357 | 11/1890 | Crowell | 70/175 X |
|---|---|---|---|
| 1,360,944 | 11/1920 | Harkins et al. | 70/181 X |
| 1,542,036 | 6/1925 | Conrader | 137/384 X |
| 1,592,835 | 7/1926 | Mock et al. | 137/383 X |
| 1,666,562 | 4/1928 | Gits | 137/233 |
| 1,705,590 | 3/1929 | Simpson | 70/232 |
| 1,764,367 | 6/1930 | Szymanski | 70/232 X |
| 1,771,382 | 7/1930 | Kramer | 70/232 |
| 1,997,113 | 4/1935 | Lewis | 70/165 X |
| 2,089,300 | 8/1937 | Schlitz | 70/23 |
| 2,365,080 | 12/1944 | Humphreys | 244/135 R X |
| 2,660,872 | 12/1953 | Beach | 70/232 X |
| 3,744,284 | 7/1973 | Waldenstrom | 70/232 |
| 3,862,555 | 1/1975 | Wirth | 70/232 X |
| 4,067,213 | 1/1978 | Little | 70/232 |
| 4,069,692 | 1/1978 | Hemphill | 70/207 |

FOREIGN PATENT DOCUMENTS

| 576069 | 5/1933 | Fed. Rep. of Germany | 70/231 |
|---|---|---|---|
| 951856 | 11/1956 | Fed. Rep. of Germany | 251/100 |
| 933523 | 1/1948 | France | 70/232 |
| 449270 | 6/1949 | Italy | 70/181 |
| 537093 | 12/1955 | Italy | 251/100 |
| 347891 | 5/1931 | United Kingdom | 70/34 |

Primary Examiner—Thomas F. Callaghan
Assistant Examiner—Carl F. Pietruszka
Attorney, Agent, or Firm—Cahill, Sutton & Thomas

[57] ABSTRACT

A lock apparatus shields the valve stem of a petcock and prevents unauthorized opening of the petcock.

12 Claims, 7 Drawing Figures

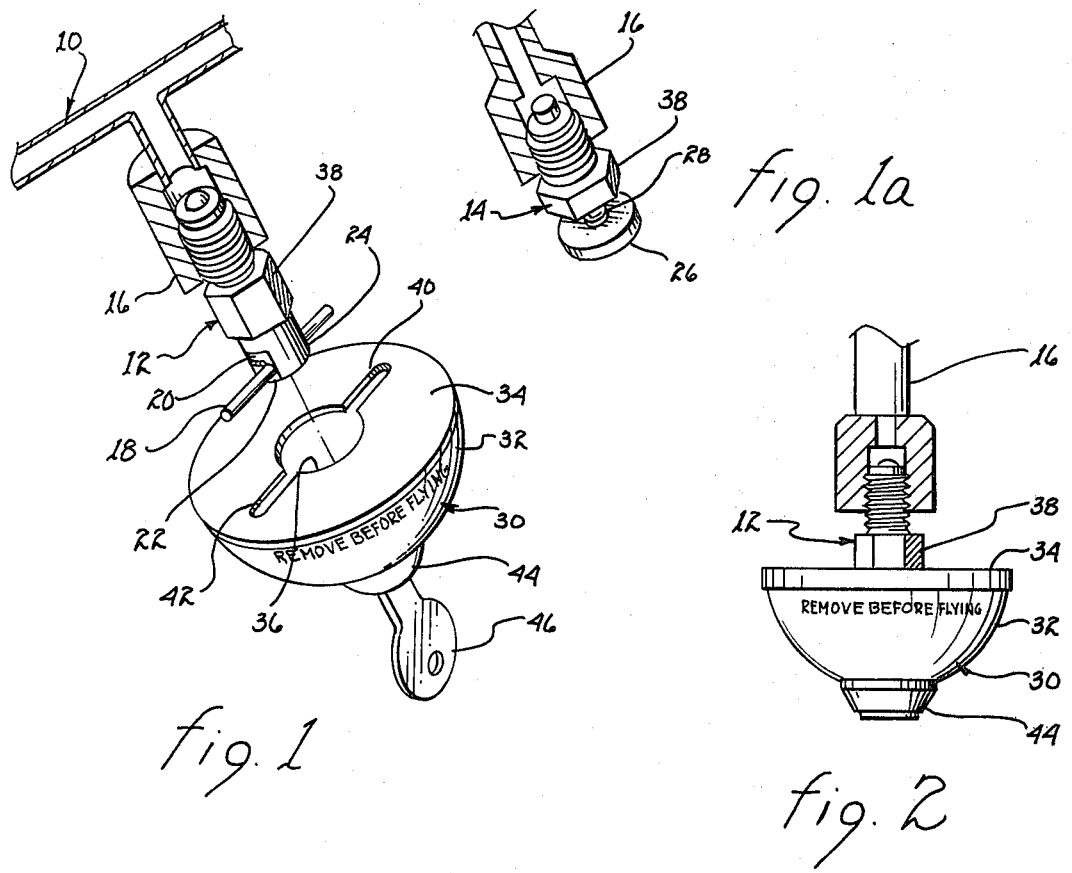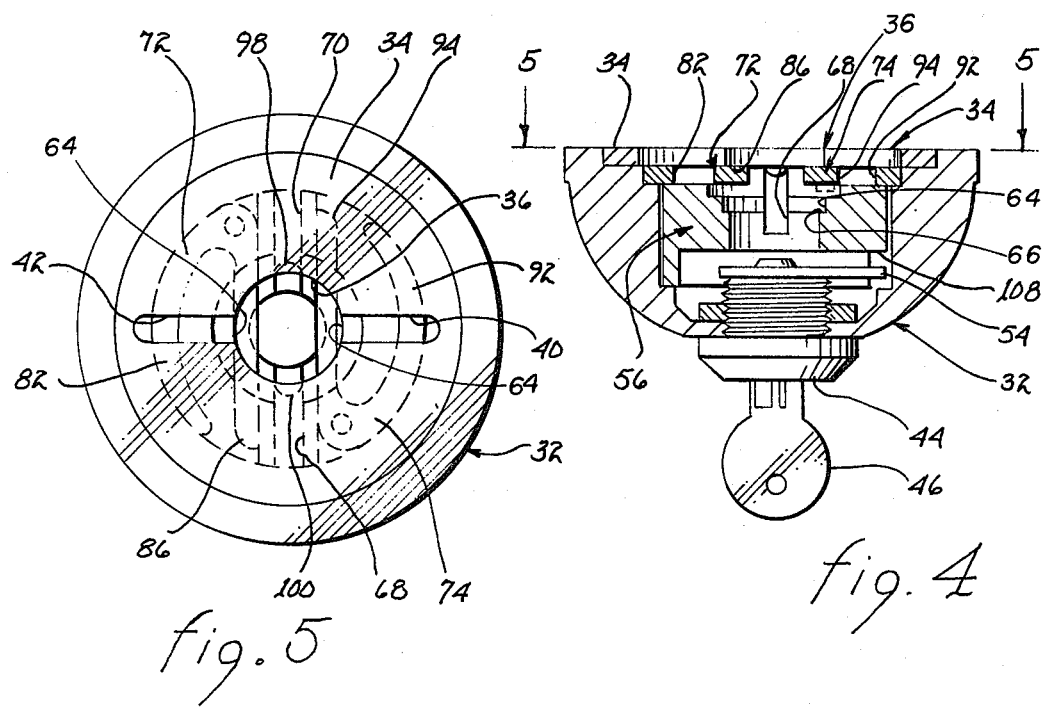

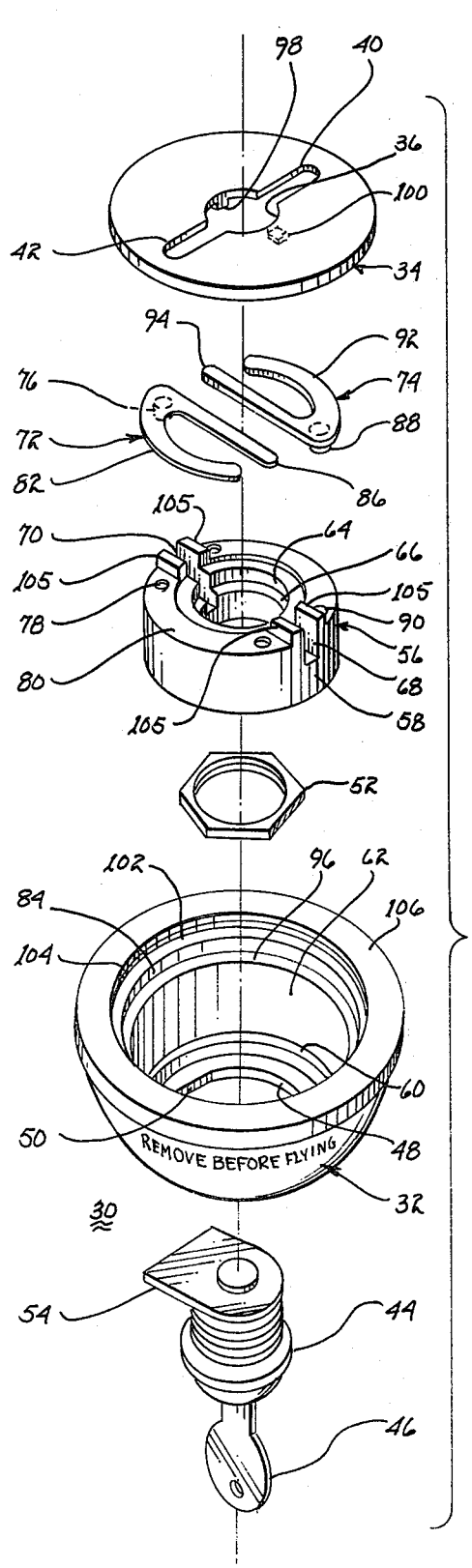
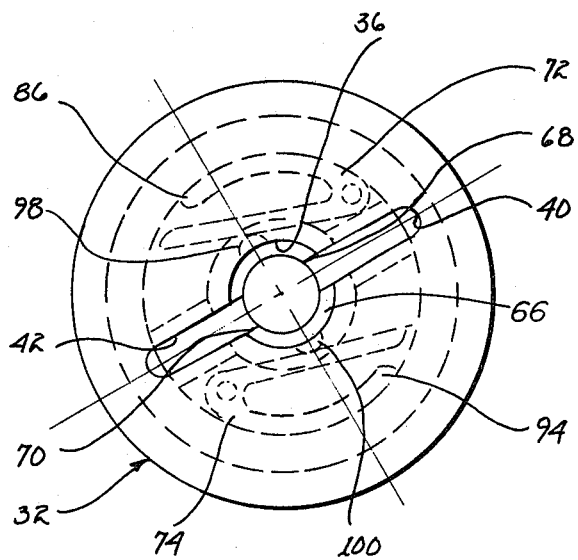
fig. 6
fig. 3

AIRCRAFT PETCOCK LOCK

The present invention relates to locks and, more particularly, to lock apparatus for petcocks.

Various locks for valves and valve elements exist in the prior art. The following U.S. patents are representative of such locks. U.S. Pat. No. 1,683,649 is directed to a multi-legged shroud for enclosing a valve head. A conventional padlock penetrably engages the shroud in an interfering relationship with the valve head to preclude removal of the shroud. U.S. Pat. No. 1,780,994 is directed to a foldably attached housing for encapsulating an in line valve disposed intermediate two pipes. A conventional padlock precludes unauthorized removal of the housing. U.S. Pat. No. 1,947,081 and 2,337,036 are directed to hinged and lockable covers for hand wheels attached to conventional valves. U.S. Pat. No. 2,439,113 includes lockable deadbolt means for interferingly precluding rotation of a valve screw. U.S. Pat. No. 3,391,554 describes a housing retained in place about a valve head by a padlock penetrably engaging an extending portion of the valve head. U.S. Pat. No. 4,062,208 is directed to a device for lockingly coupling a valve stem to the body of the valve.

The fuel systems of all powered aircraft are subject to contamination by water, which contamination occurs primarily by condensation in partially filled fuel tanks. As water is more dense than aircraft fuel, the water contaminant will percolate to the lowest point in the fuel system which is usually essentially coincident with the fuel feed to the engine(s).

To permit expulsion of the water contaminant, a petcock is located at the lowest point of the fuel system. This petcock protrudes beyond the adjacent aircraft surface, whether such a surface be the wing or the fuselage. The protrusion permits access thereto by the pilot to permit him to open the petcock and drain the fuel system until all water within the fuel system has been expunged. Thereafter, the petcock is closed. This procedure is part of the standard preflight procedure to insure against the engine misfiring or stopping during takeoff because of water in the carburetor or the fuel injection system.

The petcock employed on powered aircraft is one of two types specified by the appropriate aviation regulatory agency. One type includes a spring loaded button-operated depressable valve stem to open the petcock and permit fluid flow therethrough. The other type includes a depressable valve stem which is also rotatable for approximately ⅛ turn to lock the valve stem in the open position.

Theft of aircraft fuel from aircraft has become more widespread as the cost of the fuel has increased dramatically. Various locks have been available for many years to lock the fill caps attendant the fuel tanks of aircraft. However, no means have been developed for locking the petcocks to prevent unauthorized fuel drainage. Priorly, these existed little need for such a lock because the flow rate through the petcock is relatively small and the time consumed for theft of a substantial quantity of fuel placed the thief in too much jeopardy of being caught. However, with the very high present fuel costs, many thieves have willingly taken the additional risk of stealing fuel drained through the petcock.

It is therefore a primary object of the present invention to provide a lock apparatus for petcocks.

Another object of the present invention is to provide a lock apparatus for shielding a petcock against tampering.

Yet another object of the present invention is to provide a lock apparatus useable with petcocks having depressable valve stems.

Yet another object of the present invention is to provide a lock apparatus useable on the petcocks of powered aircraft.

A further object of the present invention is to provide an inexpensive detachably attachable petcock lock apparatus for aircraft.

A still further object of the present invention is to provide a lock apparatus useable in conjunction with differently configured petcocks.

A yet further object of the present invention is to provide a key operated detachably attached lock apparatus for exposed aircraft petcocks.

These and other objects of the present invention will become apparent to those skilled in the art as the description thereof proceeds.

The present invention may be described with greater specificity with reference to the following drawings, in which:

FIG. 1 is a pictorial representation of the interaction between a petcock and the lock apparatus;

FIG. 1a illustrates a variant of the petcock shown in FIG. 1;

FIG. 2 is a partial side view showing the lock apparatus in engaged position;

FIG. 3 is an exploded isometric view of the major components of the lock apparatus;

FIG. 4 is a cross-sectional view of the lock apparatus;

FIG. 5 is a top view taken along lines 5—5, as shown in FIG. 4, and illustrates the lock apparatus in the locked position; and FIG. 6 is a top view showing the lock apparatus in the unlocked position.

Referring to FIG. 1, there is shown an aircraft fuel system represented by fuel line 10. A petcock 12 of the type shown in FIG. 1 or petcock 14 of the type shown in FIG. 1a is attached to the lowest point of fuel line 10 by means such as coupling 16. The petcock is opened and liquid may be drawn from the fuel system by grasping cross arm 18 and forcing it toward the petcock to depress the attached spring loaded valve stem. The petcock can be maintained in the open position by rotating the cross arm into leg 20 at the extreme end of channel 22 formed in shroud 24. To open pet cock 14 shown in FIG. 1a, button 26 interconnected with spring loaded valve stem 28, is forced toward the body of the petcock.

To preclude unauthorized opening of either of petcock 12 or 14, cross arm 18 or button 26 must be positionally maintained to preclude movement thereof and the attached valve stem with respect to the body of the petcock. As either type of petcock may be used on an aircraft, this lock apparatus for locking the petcocks will advantageously be operable with either type of petcock.

FIGS. 1 and 2 generally depict a lock apparatus 30 which serves this purpose admirably well. The lock apparatus includes a housing 32, which housing may be semi-spherical as depicted. An apertured base 34 extends across the housing. The aperture therein includes a partially circular portion, aperture 36, dimensioned to receive either shroud 24 or button 26, which are essentially equal in diameter, but is of insufficient diameter to accommodate penetraton of nut-like member 38 formed as part of the petcock itself. Diametrically opposed slots 40 and 42 accommodate penetration of cross arm 18 in combination with penetration of shroud 24. A lock 44 operable with a key 46 lockingly retains either cross arm 18 or button 26 within housing 32 to prevent withdrawal thereof, as will be described in further detail below.

Referring jointly to FIGS. 3 and 4, the elements of lock apparatus 30 and their operation will be described. Lock 44 penetrably engages aperture 48 of housing 32 and is positionally maintained therewith by flat 50 keying with an equivalent flat on the lock. The lock is maintained mounted through aperture 48 by means of internally mounted nut 52. A lock arm 54 is pivotable with respect to the lock upon commensurate turning of key 46.

A ring 56 includes a circular perimeter wall 58. A radially inwardly oriented seat 60 within housing 32 locates ring 56 with respect to the longitudinal axis of the housing. A cylindrical wall 62 is dimensioned to mate with wall 58 of the ring to permit relative rotation between the housing and the ring but limit lateral displacement therebetween. The ring includes a central circular aperture 64 for receiving shroud 24 of petcock 12 or button 26 of petcock 14. An annular seat 66 may be disposed within aperture 64 to limit penetration of an inserted petcock. Diametrically opposed depressions 68 and 70 receive the respective opposed ends of cross arm 18 of petcock 12.

Spring elements 72 and 74 serve the function of precluding withdrawal of either cross arm 18 or button 26 of petcocks 12 and 14, respectively, unless lock 44 is unlocked. Spring element 72 includes a downwardly extending post 76 for pivotal engagement with a circular cavity 78 in upper annular surface 80 of ring 56. Arm 82 is curved to generally correspond with cylindrical wall 84 within housing 32. A straight arm 86 extends from a point proximate to post 76. Similarly, spring element 74 includes a post 88 for pivotal engagement with a circular cavity 90 in upper annular surface 80 of ring 56 and an arm 92 curved in general conformance with wall 84. Straight arm 94 extends from a point proximate to post 88. Annular surface 80, upon seating of ring 56 within housing 32, is approximately planar with annular shoulder 96 within the housing. Thereby, lateral sliding movement of arms 82 and 92 from annular surface 80 to shoulder 96 is not restricted. However, restriction of such movement may be incorporated depending upon the configuration of the spring elements and their elasticity.

Base 34 includes a pair of lugs 98 and 100 disposed on the under surface thereof. They may be but are not required to be aligned with a diametric line perpendicular to a diametric line extending through slots 40 and 42. The base nests upon shoulder 102 within housing 32 and adjacent cylindrical wall 104. Preferably, the top surface of the base is flush with annular surface 106 of the base, as illustrated in FIGS. 2 and 4. Alternatively, the base, rather than being recessed within the housing may extend thereacross. To preclude drooping of the base into interfering contact with the spring elements, standoffs 105 may be formed as part of ring 56 to bear against the base.

Assembly of the components illustrated in FIG. 3 are best described with respect to FIG. 4. Lock arm 54 keys into a slot 108 disposed in the lower part of ring 56 whereby relative rotational movement of the ring about lock 44 is precluded without commensurate rotational movement of the lock arm. Movement of lock 44 with respect to housing 32 is precluded by flat 50 in the housing. After placement of ring 56 within housing 32, spring elements 72 and 74 are laid upon the ring such that post 76 engages cavity 78 and post 88 engages cavity 90. It is to be understood that the spring elements may have some pivotal freedom about their respective posts. The spring elements are dimensioned such that in the quiescent state the spacing intermediate arms 86 and 94 is less than the diameter of button 26. Base 34 is placed within housing 32 and oriented in such a manner that lugs 98 and 100 are disposed intermediate arms 86 and 94.

The operation of the present invention will be described with particular reference to FIGS. 5 and 6. In the quiescent state, arms 86 and 94 of spring element 72 and 74 extend across aperture 36 within base 34. To insert the valve stem portion of either petcock 12 or 14 within housing 32, the interfering arms of the spring elements may be repositioned out of super imposed alignment with aperture 36. Such repositioning is effected by turning key 46 which results in rotation of lock arm 54. Rotation of the lock arm produces a commensurate rotational movement of ring 56; preferably, such movement extends through an angle of ninety degrees. When ring 56 is rotated, commensurate rotational movement of spring elements 72 and 74 will occur. Such rotational movement, for example ninety degrees in a clockwise direction as shown in FIG. 6, results in sliding engagement of arm 86 with lug 98 and sliding engagement of arm 94 with lug 100. The sliding engagement causes radial displacement of the respective arms due to the interference between the arms and the lugs. Such radial displacement brings the arms out of superimposed alignment with aperture 36, as illustrated. Lock apparatus 30 may now be fitted to either petcock 12 or 14.

To attach lock apparatus 30 to a petcock, it is brought into engagement with the petcock by insertion of shroud 24 and cross arm 18 through aperture 36 and slots 40, 42 after key 46 has been turned to displace arms 86 and 94 out of superimposed alignment with aperture 36. Penetration thereof will be limited by interference between nut like member 38 and the top surface of base 34. Alternatively, the interference may be achieved by the shroud engaging seat 66 in ring 56. After insertion, key 46 is turned counterclockwise to relocate ring 56 within housing 32. Such relocation will result in rearrangement of the parts similar to the position shown in FIG. 5. That is, depressions 68 and 70, containing the opposed arms of cross arm 18 will have been relatively rotated out of alignment with slots 40 and 42. Thereby, withdrawal of the cross arm is precluded by the base. The resulting enclosure of the operative parts of petcock 12 as shown in FIG. 2, will preclude operation of the petcock.

To obtain access to petcock 12, key 46 is turned in the clockwise direction until depressions 68 and 70 are once more realigned with slots 40 and 42. Withdrawal of the cross arm from within housing 32 may then be effected.

To lockingly insert petcock 14 into lock apparatus 30, key 46 is turned clockwise to force arms 86 to 94 out of superimposed alignment with aperture 36. Lock apparatus 30 is now mounted upon petcock 14 by penetrable insertion of button 26 through aperture 36 until base 34 interferingly engages with nut like member 38. By turning key 46 counterclockwise, the resulting rotational movement of ring 56 brings lugs 98 and 100 out of interfering engagement with arms 86 and 94 to permit them to interferingly overlap with underlying button 26. The resulting overlap precludes withdrawal of button 26 from within the lock apparatus. Hence, the lock apparatus will be mounted upon petcock 14 in the manner illustrated in FIG. 2.

To unlock the lock apparatus, key 46 is turned clockwise to produce interference between arms 86, 94 and lugs 98, 100, which intereference laterally displaces the arms out of overlapping relationship with button 26. The lock apparatus may thereafter by withdrawn from petcock 14.

As will be evident to those in the plastics manufacturing business, all of the parts are easily and inexpensively manufacturable; and lock 44 is of a conventional commercially available type. Hence, lock apparatus is relatively inexpensive to construct and assemble.

While the principles of the invention have now been made clear in an illustrative embodiment, there will be immediately obvious to those skilled in the art many modifications of structure, arrangement, proportions, elements, materials and components, used in the practice of the invention which are particularly adapted for specific environments and operating requirements without departing from those principles.

I claim:

1. A lock apparatus for precluding operation of a petcock operable by a depressible valve stem, said lock apparatus comprising in combination:
(a) a housing for receiving a button located proximate the extremity of the valve stem to preclude movement of the valve stem with respect to the petcock, said housing including a base apertured to accommodate penetration into said housing of the valve stem and button;
(b) means for restraining withdrawal of the received button;
(c) a ring rotatable within said housing for actuating said restraining means in response to rotation of said ring relative to said housing, said restraining means including laterally displaceable spring elements for interferingly retaining the button and lugs for repositioning laterally said spring elements upon rotation of said ring relative to said housing after penetration of the button through said base.

2. The lock apparatus as set forth in claim 1 wherein said restraining means includes lock means for selectively inhibiting relative rotation between said ring and said housing.

3. The lock apparatus as set forth in claim 1 wherein said spring elements extend from said ring and wherein said lugs extend from said base.

4. The lock apparatus as set forth in claim 3 wherein said restraining means includes lock means for selectively inhibiting relative rotation between said ring and said housing.

5. The lock apparatus as set forth in claim 3 wherein said spring elements are pivotally attached to said ring.

6. The lock apparatus as set forth in claim 5 wherein said restraining means includes lock means for selectively inhibiting relative rotation between said ring and said housing.

7. A lock apparatus for precluding operation of petcocks operable by longitudinal movement of a valve stem, said lock apparatus comprising in combination:
(a) a housing for receiving a segment of the valve stem to preclude movement of the valve stem with respect to the petcock, said housing including a base apertured to penetrably receive the segment which is either a valve stem having a cross arm or a valve stem having a button disposed proximate the end thereof;
(b) means for restraining withdrawal of the received segment;
(c) a ring rotatable within said housing for actuating said restraining means in response to rotation of said ring relative to said housing, said ring including a pair of diametrically opposed depressions for receiving opposed ends of the cross arm to locate the cross arm out of alignment with the aperture of said base upon relative rotation between said ring and said housing after penetration of the cross arm through said base, said retaining means including laterally displaceable spring elements for interferingly retaining the button and lugs for repositioning laterally said spring elements upon rotation of said ring relative to said housing after penetration of the button through said base.

8. The lock apparatus as set forth in claim 7 wherein said restraining means includes lock means for selectively inhibiting relative rotation between said ring and said housing.

9. The lock apparatus as set forth in claim 7 wherein said spring elements extend from said ring and wherein said lugs extend from said base.

10. The lock apparatus as set forth in claim 9 wherein said restraining means includes lock means for selectively inhibiting relative rotation between said ring and said housing.

11. The lock apparatus as set forth in claim 7 wherein said spring elements are pivotally attached to said ring.

12. The lock apparatus as set forth in claim 11 wherein said restraining means includes lock means for selectively inhibiting relative rotation between said ring and said housing.

* * * * *